Aug. 14, 1928.

M. PITZMAN 1,680,567

INTERNAL COMBUSTION ENGINE

Filed Feb. 8, 1922

INVENTOR
MARSH PITZMAN
BY
E. E. Huffman
ATTORNEY

Patented Aug. 14, 1928.

1,680,567

UNITED STATES PATENT OFFICE.

MARSH PITZMAN, OF ST. LOUIS, MISSOURI.

INTERNAL-COMBUSTION ENGINE.

Application filed February 8, 1922. Serial No. 534,883.

My invention relates to internal combustion engines and particularly to means for independently regulating the water supply to the several cylinders of a multi-cylinder engine so as to secure uniform firing conditions therein.

I have found from a large number of experiments with multi-cylinder engines of the type commonly used in motor vehicles i. e. in which the engine is cooled by the combined action of a fan delivering air against one end of the engine casing and a water jacket common to all the cylinders, that the firing conditions of the various cylinders cannot be maintained uniform. Taking, for example, a four cylinder engine of the type above referred to I find that cylinder number one (the cylinder nearest the fan) characteristically shoots a moist half charge. Cylinder number two shoots a somewhat moist but very forceful and hot charge. Cylinder number three shoots a dry and distinctly weaker charge, and cylinder number four shoots a moist charge, sometimes almost as weak as number one, but at other times fully as strong as cylinder number two. As is obvious from my previous applications Nos. 514,523 and 530,363, I attribute these characteristic variations in explosions to differences in the temperature within the combustion chamber.

In order to overcome the differences in the firing conditions in the various cylinders as stated above, I provide each cylinder with a separate water jacket and independently regulate the supply of water from the radiator to each water jacket. This I may do by inserting in the branch pipes to or from each cylinder water jacket a valve or other regulating device.

Figure 1:
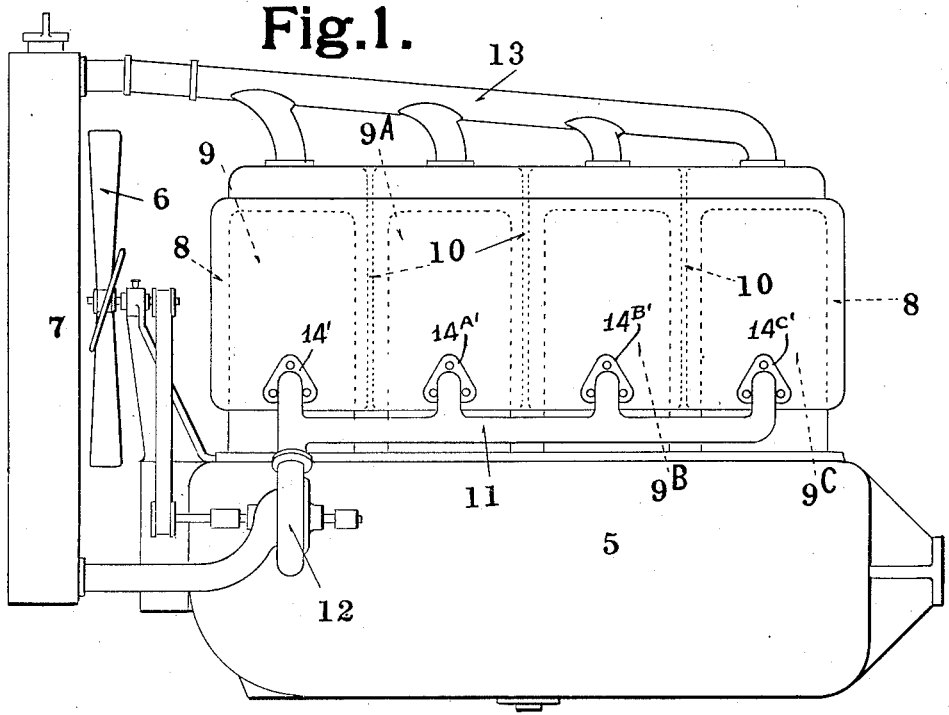
Figure 2:
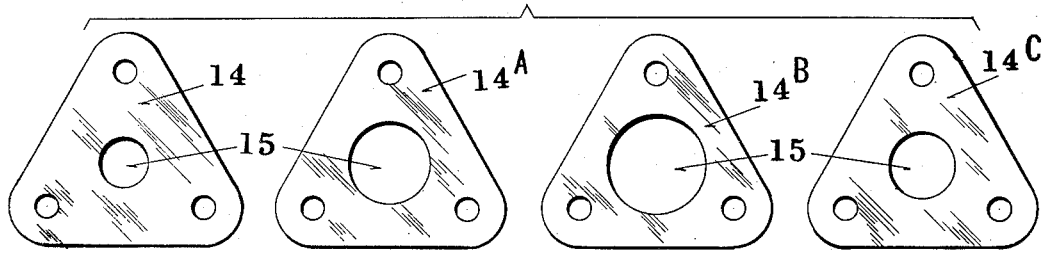

In the accompanying drawings which illustrate one form of engine made in accordance with my invention, Figure 1 is a side elevation and Figure 2 is an enlarged view of a set of diaphragms for controlling the flow of water to the various cylinders of the engine.

5 indicates an internal combustion engine which is of the usual block type. The engine 5 is cooled by a fan 6 and by water from the radiator 7 circulating through water jackets 8 surrounding the cylinders 9, 9$^A$, 9$^B$ and 9$^C$. The water jackets 8 are completely separated from each other by partitions 10 so that the water to each jacket may be independently regulated by suitable controlling means 14, 14$^A$, 14$^B$ and 14$^C$, placed within the branches of the water supply pipe 11 leading from the supply pump 12 or in the branches of the water return pipe 13, but preferably in the former. This water regulation should be such that under average operating speed and running conditions the combustion temperature of the various cylinders will be maintained uniform. I prefer to secure the water regulation by means of sheet metal diaphragms 14, 14$^A$, 14$^B$, and 14$^C$ placed between the flanges 14', 14$^{A'}$, 14$^{B'}$ and 14$^{C'}$ respectively of the branches of the supply pipe 11 and the water jackets surrounding the cylinders 9, 9$^A$, 9$^B$ and 9$^C$ respectively. Each of the diaphragms is provided with a water passage 15, the size of these passages varying in accordance with the amount of water necessary to maintain each cylinder at its proper working temperature. The relative size of the various passages shown in Figure 2 is that which I have found to be necessary to secure the desired results, other factors being normal, that controlling the flow of water to the third cylinder being the largest, that controlling the flow to the second somewhat smaller, that to the fourth cylinder still smaller and that to the first cylinder smallest of all.

Having fully described my invention what I claim as new and desire to secure by Letters Patent of the United States is:

1. An internal combustion engine comprising a plurality of cylinders, water jackets for each of said cylinders, said jackets being separated at their discharge ends, and controlling means for the water circulating in said jackets including diaphragms provided with different sizes of openings and situated at the inlet ends of said jackets.

2. An internal combustion engine comprising a plurality of cylinders, water jackets for each of said cylinders, said jackets being separated at their discharge ends, a common water supply for said jackets, a pump, and controlling means for the water including diaphragms provided with different sizes of openings and situated between said pump and the inlet ends of the water jackets.

3. An internal combustion engine comprising more than three cylinders linearly arranged, water jackets for each of said cylinders, said jackets being completely separated, a common water supply for said jackets, and separate inlets of predetermined size for each jacket, the inlets of the first three jackets increasing progressively in inlet area, and the inlet of the last jacket being of less area than the third jacket.

4. An internal combustion engine comprising more than two cylinders linearly arranged, water jackets for each of said cylinders, said jackets being completely separated, a common water supply for said jackets, and separate inlets of predetermined size for each jacket, the end inlets being of different size, and an intermediate inlet being larger than either end inlet.

5. An internal combustion engine comprising more than three cylinders linearly arranged, water jackets for each of said cylinders, said jackets being completely separated, a common water supply for said jackets, and separate inlets of predetermined size for each jacket, the end inlets being of different size and the intermediate inlets progressively increasing in size from one of the end inlets.

6. An internal combustion engine comprising a plurality of cylinders linearly arranged, a water jacket for each cylinder, none of said jackets communicating with another jacket, and water flow restriction means controlling the circulation of water through the several jackets to produce sufficiently less cooling effects on particular cylinders than produced by the circulating water on another cylinder to maintain the cylinder wall temperatures of all the cylinders substantially equal.

7. An internal combustion engine comprising a plurality of cylinders linearly arranged, water jackets for said cylinders, the jackets of the end cylinders not communicating with other jackets, and water flow restriction means controlling the circulation of water through the several jackets to produce a sufficiently less cooling effect on the end cylinders than on an intermediate cylinder to maintain the cylinder wall temperatures of said end cylinders and said intermediate cylinder substantially equal.

In testimony whereof, I have hereunto set my hand.

MARSH PITZMAN